(12) United States Patent
Nakao et al.

(10) Patent No.: US 12,050,342 B2
(45) Date of Patent: Jul. 30, 2024

(54) OPTICAL MULTIPLEXER AND OPTICAL MULTIPLEXING METHOD

(71) Applicant: University of Fukui, Fukui (JP)

(72) Inventors: Akira Nakao, Fukui (JP); Toshio Katsuyama, Fukui (JP); Shoji Yamada, Fukui (JP); Hitoshi Higuchi, Fukui (JP)

(73) Assignee: University of Fukui, Fukui (JP)

( * ) Notice: Subject to any disclaimer, the term of this patent is extended or adjusted under 35 U.S.C. 154(b) by 0 days.

(21) Appl. No.: 17/605,871

(22) PCT Filed: Feb. 5, 2021

(86) PCT No.: PCT/JP2021/004387
§ 371 (c)(1),
(2) Date: Oct. 22, 2021

(87) PCT Pub. No.: WO2022/168273
PCT Pub. Date: Aug. 11, 2022

(65) Prior Publication Data
US 2024/0027683 A1   Jan. 25, 2024

(51) Int. Cl.
G02B 6/12       (2006.01)
G02B 6/125      (2006.01)

(52) U.S. Cl.
CPC ......... *G02B 6/12007* (2013.01); *G02B 6/125* (2013.01)

(58) Field of Classification Search
CPC .... G02B 6/125; G02B 6/12007; G02B 6/293; G02B 6/29331; G02B 6/29332;
(Continued)

(56) References Cited

U.S. PATENT DOCUMENTS 4,496,211 A    6/1985 Daniel
5,664,037 A *  9/1997 Weidman ............. G02B 6/2856
                                                385/50
(Continued)

FOREIGN PATENT DOCUMENTS

JP    2003050323 A    2/2003
JP    2019035876 A    3/2019
(Continued)

OTHER PUBLICATIONS

World Intellectual Property Organization, International Search Report for International Application No. PCT/JP2021/004387, Mail date Apr. 13, 2021, 12 total pages.

*Primary Examiner* — Michelle R Connelly
*Assistant Examiner* — Emma R. Oxford
(74) *Attorney, Agent, or Firm* — SoCal IP Law Group LLP; Mark Andrew Goldstein

(57) ABSTRACT

An optical multiplexer and an optical multiplexing method capable of multiplexing light of four or more types of wavelengths are provided. An optical multiplexer capable of multiplexing light of a plurality of wavelengths includes a plurality of coupling parts each including a pair of main entrance paths, a pair of main exit paths, and a main coupler arranged between the main entrance paths and the main exit paths, the main coupler causing light entering from the main entrance paths to be coupled and exit from the main exit paths, in which one of the main entrance paths of the coupling parts is joined to one of the main exit paths of anther coupling parts and the main coupler has coupling length different from at least one other main coupler.

9 Claims, 11 Drawing Sheets

US 12,050,342 B2
Page 2

(58) Field of Classification Search
CPC .............. G02B 6/29355; G02B 6/2938; G02B 2006/12164; G02B 6/00; G02B 6/10; G02B 6/12; G02B 6/24; G02B 6/26; G02B 6/28
See application file for complete search history.

(56) References Cited

U.S. PATENT DOCUMENTS

| | | | |
|---|---|---|---|
| 6,160,932 | A | 12/2000 | Huang et al. |
| 7,519,240 | B1* | 4/2009 | Little .................... G02B 6/122 385/11 |
| 10,634,851 | B2* | 4/2020 | Steinbrecher ........ G02B 6/3542 |
| 2002/0186730 | A1 | 12/2002 | Garbuzov |
| 2003/0002786 | A1 | 1/2003 | Ooyama et al. |
| 2003/0031406 | A1* | 2/2003 | Saida ................. G02B 6/29386 385/27 |
| 2004/0018017 | A1* | 1/2004 | Hatayama .......... G02B 6/12007 398/43 |
| 2012/0068609 | A1 | 3/2012 | Ide et al. |
| 2015/0003773 | A1 | 1/2015 | Klein et al. |
| 2015/0241633 | A1* | 8/2015 | Kusaka ................. G02F 1/2255 385/24 |
| 2016/0178846 | A1* | 6/2016 | Summers ............. G02B 6/2938 385/48 |
| 2018/0306978 | A1 | 10/2018 | Kagawa et al. |
| 2019/0056552 | A1* | 2/2019 | Sakamoto .......... G02B 6/12007 |
| 2021/0003903 | A1* | 1/2021 | Vidrighin ............... G02F 1/3138 |
| 2021/0396932 | A1* | 12/2021 | Perez Lopez .......... G02B 6/125 |

FOREIGN PATENT DOCUMENTS

| | | |
|---|---|---|
| WO | 02101893 A1 | 12/2002 |
| WO | 2010137661 A1 | 12/2010 |
| WO | 2017065225 A1 | 4/2017 |
| WO | WO-2020086744 A1 * | 4/2020 |
| WO | 2021002254 A1 | 1/2021 |

* cited by examiner

FIG. 4

| WAVELENGTH | COMPLETE COUPLING LENGTH |
|---|---|
| $\lambda 1$ | 2L |
| $\lambda 2$ | L |
| $\lambda 3$ | L/2 |
| $\lambda 4$ | L/3 |

FIG. 5

| WAVELENGTH | | MULTIPLEXING EFFICIENCY |
|---|---|---|
| $\lambda 1$ | 450nm | 96.1% |
| $\lambda 2$ | 520nm | 92.8% |
| $\lambda 3$ | 635nm | 98.0% |
| $\lambda 4$ | 720nm | 99.9% |

AVERAGE MULTIPLEXING EFFICIENCY FOR FOUR WAVELENGTHS: 96.7%

| WAVELENGTH | COMPLETE COUPLING LENGTH |
|---|---|
| $\lambda 1$ | 2L |
| $\lambda 2$ | L |
| $\lambda 3$ | L/2 |
| $\lambda 4$ | L/3 |
| $\lambda 5$ | L/4 |

FIG .12

| WAVELENGTH | | MULTIPLEXING EFFICIENCY |
|---|---|---|
| $\lambda 1$ | 450nm | 97.7% |
| $\lambda 2$ | 520nm | 91.6% |
| $\lambda 3$ | 635nm | 87.3% |
| $\lambda 4$ | 720nm | 99.8% |
| $\lambda 5$ | 840nm | 96.8% |

AVERAGE MULTIPLEXING EFFICIENCY FOR FIVE WAVELENGTHS: 94.6%

FIG. 14

| WAVELENGTH | COMPLETE COUPLING LENGTH |
|---|---|
| $\lambda 1$ | 2L |
| $\lambda 2$ | L |
| $\lambda 3$ | L/2 |
| $\lambda 4$ | L/3 |
| $\lambda 5$ | L/6 |

FIG. 15

| WAVELENGTH | | MULTIPLEXING EFFICIENCY |
|---|---|---|
| $\lambda 1$ | 450nm | 96.1% |
| $\lambda 2$ | 520nm | 92.7% |
| $\lambda 3$ | 635nm | 97.6% |
| $\lambda 4$ | 720nm | 94.8% |
| $\lambda 5$ | 960nm | 95.9% |

AVERAGE MULTIPLEXING EFFICIENCY FOR FIVE WAVELENGTHS: 95.4%

OPTICAL MULTIPLEXER AND OPTICAL MULTIPLEXING METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/JP2021/004387, filed Feb. 5, 2021 entitled, "OPTICAL MULTIPLEXER AND OPTICAL MULTIPLEXING METHOD", which is incorporated herein by reference in its entirety.

TECHNICAL FIELD

The present invention relates to an optical multiplexer and an optical multiplexing method.

BACKGROUND ART

Conventionally, a laser display is known in which an image is visually recognized by a user by two-dimensionally scanning a laser beam. With a laser display, in general, three colors of visible light in proximity to each other, which are emitted from an R (red) light source, a G (green) light source, and a B (blue) light source, respectively, are transmitted to an image displaying unit. The image displaying unit two-dimensionally scans the transmitted light, thereby projecting an image onto a projection target. For example, Patent Document 1 discloses an optical integrated circuit for projecting laser beams in proximity, corresponding to the colors of RGB, respectively.

Patent Document 1: Japanese Unexamined Patent Application, Publication No. 2019-35876

DISCLOSURE OF THE INVENTION

Problems to be Solved by the Invention

As described above, Patent Document 1 is limited to proximity (multiplexing) of three colors of RGB. On the other hand, it would be preferable if light of four or more colors (or four or more types of wavelengths) can be multiplexed.

The present invention has been made against the conventional circumstances, and an object of the present invention is to provide an optical multiplexer and an optical multiplexing method capable of multiplexing light of four or more types of wavelengths.

Means for Solving the Problems

The present invention relates to an optical multiplexer capable of multiplexing light of a plurality of wavelengths, in which the optical multiplexer includes a plurality of coupling parts, each including a pair of main entrance paths, a pair of main exit paths, and a main coupler arranged between the main entrance paths and the main exit paths, in which the main coupler causes light entering from the main entrance paths to be coupled and exit from the main exit paths, one of the main entrance paths of the coupling parts is joined to one of the main exit paths of another coupling parts, and the main coupler each has a coupling characteristic different from that of at least one other main coupler.

It is preferable that the optical multiplexer further includes: a reference unit including a set of the plurality of coupling parts; and a sub unit connectable to the reference unit, in which the sub unit includes: a pair of sub entrance paths; a pair of sub exit paths; and a sub coupler causing light entering from the sub entrance paths to be coupled and exit from the sub exit paths, in which the sub entrance paths are configured to be connectable to the main exit paths, and the sub exit paths are configured to be connectable to the main entrance paths.

It is preferable that the sub entrance paths are configured to be connectable to the sub exit paths of another sub unit.

It is preferable that the sub exit paths are configured to be connectable to the sub entrance paths of another sub unit.

It is preferable that the reference unit includes three sets of the coupling parts including a first coupling part, a second coupling part, and a third coupling part, in which a second one of the main exit paths of the first coupling part is connected to a first one of the main entrance paths of the third coupling part, a first one of the main exit paths of the second coupling part is connected to a second one of the main entrance paths of the third coupling part, and the main coupler of the first coupling part, the main coupler of the second coupling part, and the main coupler of the third coupling part have different coupling characteristics.

It is preferable that any one of light having the longest wavelength or light having the next longest wavelength, among the light of the plurality of wavelengths entering the reference unit, enters from a first one of the main entrance paths of the first coupling part, and other one of the light having the longest wavelength or the light having the next longest wavelength, among the light of the plurality of wavelengths entering the reference unit, enters from a second one of the main entrance paths of the second coupling part.

It is preferable that the main coupler of the first coupling part has a coupling characteristic to cause light entering from any one of the main entrance paths of the first coupling part to exit from a second one of the main exit paths, the main coupler of the second coupling part has a coupling characteristic to cause light entering from any one of the main entrance paths of the second coupling part to exit from a first one of the main exit paths, and the main coupler of the third coupling part has a coupling characteristic to cause light entering from any one of the main entrance paths of the third coupling part to exit from any one of the main exit paths.

It is preferable that a first one of the sub exit paths of the sub unit is connected to a second one of the main entrance paths of the first coupling part, and a second one of the sub exit paths of the sub unit is connected to a first one of the main entrance paths of the second coupling part.

It is preferable that the sub coupler of sub unit has a coupling characteristic to cause light entering from the pair of sub entrance paths to exit from at least a first one of the sub exit paths.

It is preferable that a second one of the sub entrance paths of the sub unit is connected to a first one of the sub exit paths of another sub unit.

It is preferable that a first one of the main exit paths of the third coupling part is connected to a second one of the sub entrance paths of another sub unit.

It is preferable that the sub coupler of the sub unit has a coupling characteristic to cause at least any one of light entering from the pair of sub entrance paths to be split and exit from the pair of sub exit paths.

The present invention also relates to an optical multiplexing method of multiplexing light of a plurality of wavelengths, in which the method includes: a first multiplexed light outputting step of multiplexing part of first light and second light into first multiplexed light and outputting the first multiplexed light; a second multiplexed light outputting step of multiplexing other part of the first light and third light into second multiplexed light and outputting the second multiplexed light; a third multiplexed light outputting step of multiplexing the first multiplexed light and fourth light into third multiplexed light and outputting the third multiplexed light; and a fourth multiplexed light outputting step of multiplexing the second multiplexed light and the third multiplexed light into fourth multiplexed light and outputting the fourth multiplexed light.

It is preferable that $\lambda 1 < \lambda 2 < \lambda 3 < \lambda 4$, where a wavelength of the first light is $\lambda 1$, a wavelength of the second light is $\lambda 2$, a wavelength of the third light is $\lambda 3$, and a wavelength of the fourth light is $\lambda 4$.

The present invention also relates to an optical multiplexing method of multiplexing light of a plurality of wavelengths, in which the method includes a step of connecting an exit path of a coupling part to an entrance path of another coupling part, the coupling part capable of multiplexing at least two light.

It is preferable that $\lambda 1 < \lambda 2 < \lambda 3 < \lambda 4$, where a wavelength of the first light is $\lambda 1$, a wavelength of the second light is $\lambda 2$, a wavelength of the third light is $\lambda 3$, and a wavelength of the fourth light is $\lambda 4$.

Effects of the Invention

The present invention can provide an optical multiplexer and an optical multiplexing method capable of multiplexing light of four or more types of wavelengths.

BRIEF DESCRIPTION OF THE DRAWINGS

FIG. 4 is a table illustrating a relationship between the wavelength of the light incident on the optical multiplexer of the first embodiment and coupling characteristics;

FIG. 5 is a table illustrating wavelength and multiplexing efficiency of light entering the optical multiplexer of the first embodiment;

FIG. 11 is a table illustrating coupling characteristics for wavelengths of light entering the optical multiplexer of the second embodiment;

FIG. 12 is a table illustrating wavelength and multiplexing efficiency of light entering the optical multiplexer of the second embodiment;

FIG. 14 is a table illustrating coupling characteristics for wavelengths of light entering the optical multiplexer of the third embodiment; and FIG. 15 is a table illustrating wavelength and multiplexing efficiency of light entering the optical multiplexer of the third embodiment.

PREFERRED MODE FOR CARRYING OUT THE INVENTION

Hereinafter, an optical multiplexer 1 and an optical multiplexing method according to each embodiment of the present invention will be described by referring to FIGS. 1 to 15. First, an outline of the optical multiplexer 1 and the optical multiplexing method according to each embodiment will be described.

Figure 1:
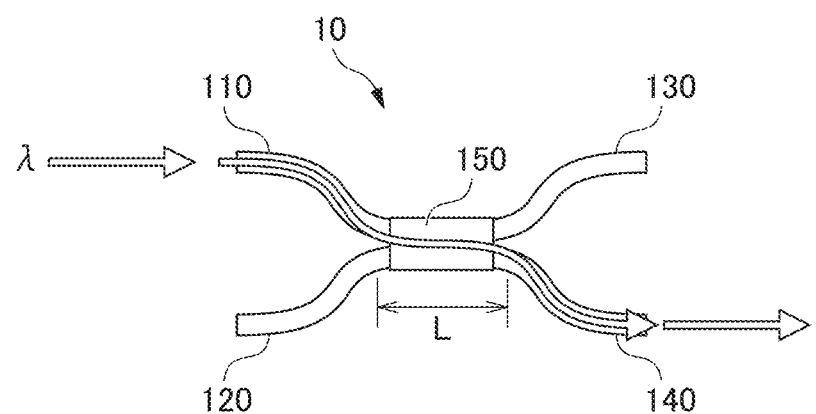
FIG. 1 is a schematic diagram illustrating a relationship between a coupling part of an optical multiplexer according to a first embodiment of the present invention and entering light.

For example, the optical multiplexer 1 is a device capable of multiplexing light of a plurality of wavelengths. In particular, the optical multiplexer 1 is a device capable of multiplexing light of four or more different wavelengths. For example, as illustrated in FIG. 1, the optical multiplexer 1 includes a plurality of coupling parts 10, each including a pair of main entrance paths 110, 120, a pair of main exit paths 130, 140, and a main coupler 150. By combining the plurality of coupling parts 10, the optical multiplexer 1 multiplexes light of a plurality of wavelengths. For example, the optical multiplexer 1 has a structure in which the plurality of coupling parts 10 are combined.

Next, a configuration of the coupling part 10 will be described. Here, the coupling part 10 as a directional coupler is described; however, any other types than a directional coupler is applicable, as long as light enters from a pair of main entrance paths and exits from a pair of main exit paths. For example, the coupling part 10 is not necessarily limited to a directional coupler and may be any other types such as a multimode interference coupler other than a directional coupler, as long as light enters from the pair of main entrance paths 110, 120 and exits from the pair of main exit paths 130, 140. A directional coupler refers to a coupler having a structure in which two light waveguides are closely arranged in parallel. A directional coupler is an optical coupler that utilizes a phenomenon in which a light field leaking from a light waveguide reaches a neighboring light waveguide, and as the light propagates along the waveguide, the light passes onto the neighboring waveguide or returns to the original waveguide again.

A multimode interference coupler consists of a relatively wide light waveguide (multimode light waveguide) in relation to a wavelength, and performs optical switching by utilizing multiple modes of light propagating through the light waveguide, and connecting a light entrance/exit waveguide to the multimode light waveguide. A variety of shapes of a multimode light waveguide exist, including not only a simple type having a wide light waveguide, but also a type consisting of more than one light waveguide, a type having a variable width of waveguide depending on the propagating direction, or the like.

Each of the pair of main entrance paths 110, 120 is a so-called waveguide. For example, the main entrance paths 110, 120 are preferably a single-mode waveguide or a waveguide that is primarily composed of a fundamental mode. Each of the pair of main entrance paths 110, 120 serves as a transmission path for entering light. In the present embodiment, the pair of main entrance paths 110, 120 approach each other along a transmission direction from the entrance ports, and the most typical example of the paths has a shape curved in a direction approaching each other.

Each of the pair of main exit paths 130, 140 is a so-called waveguide. Each of the pair of main exit paths 130, 140 serves as a transmission path for exiting light. In the present embodiment, the pair of main exit paths 130, 140 separate from each other along the transmission direction toward the exit ports, and the most typical example of the paths has a shape curved in a direction separating from each other.

Figure 2:
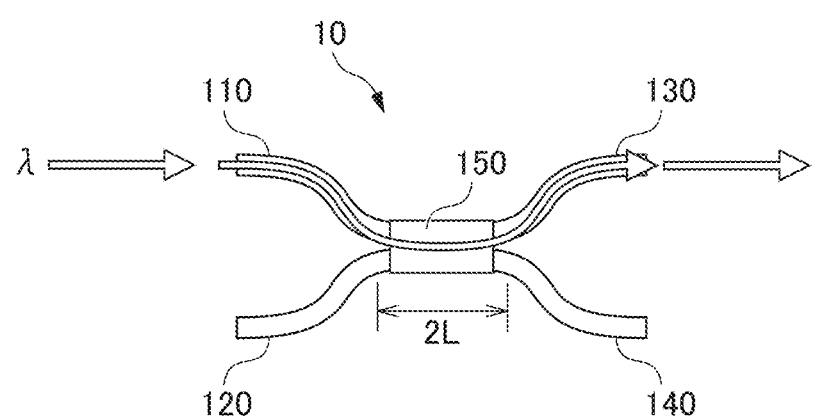
FIG. 2 is a schematic diagram illustrating a relationship between the coupling part of the optical multiplexer of the first embodiment and entering light.

The main coupler 150 is a multiplexer that practically multiplexes light entering from the main entrance paths 110, 120. The main coupler 150 is arranged between the main entrance paths 110, 120 and the main exit paths 130, 140, couples light entering from the main entrance paths 110, 120, and causes the light to exit from the main exit paths 130, 140. The main coupler 150 has predetermined coupling characteristics. For example, as illustrated in FIG. 1, the main coupler 150 has coupling characteristics to cause almost entire light of a predetermined wavelength $\lambda$ entering from the first main entrance path 110 to exit from the second main exit path 140. In the present embodiment, the length (coupling length) of the main coupler 150 for imparting the above-mentioned coupling characteristics is referred to as "complete coupling length" for a predetermined wavelength. As illustrated in FIG. 2, in the case in which the main coupler 150 has twice the length of the complete coupling length, the main coupler 150 has coupling characteristics to cause almost entire light of a predetermined wavelength $\lambda$ entering from the first main entrance path 110 to exit from the first main exit path 130. In FIG. 2, light of a wavelength $\lambda$ entering from the first main entrance path 110 is firstly transmitted to the second main exit path 140 and then transmitted to the first main exit path 130, via the main coupler 150. In the case in which the main coupler 150 has a length 3L, light of a wavelength $\lambda$ entering from the first main entrance path 110 is firstly transmitted to the second main exit path 140, then transmitted to the first main exit path 130, and transmitted again to the first main entrance path 140, via the main coupler 150. As described above, the entering light exits from any one or both of the pair of main exit paths 130, 140, depending on the complete coupling length as determined by the wavelength $\lambda$ and the length of the main coupler 150.

Here, one of the main entrance paths 110, 120 of the coupling part 10 is connected to one of the main exit paths 130, 140 of another coupling part 10. As a result, light entering from one coupling part 10 passes through another one or plurality of coupling parts 10 and finally exits from one of the main exit paths 130, 140.

In the following embodiments, three coupling parts 10 connected in a predetermined combination will be described as a reference unit 100. The coupling part 10 configured to be detachable from the reference unit 100 will be described as a sub unit 21. In the following embodiments, light of various wavelengths can be multiplexed by changing the combination of connecting the sub unit 21 to the reference unit 100.

First Embodiment

Figure 3:
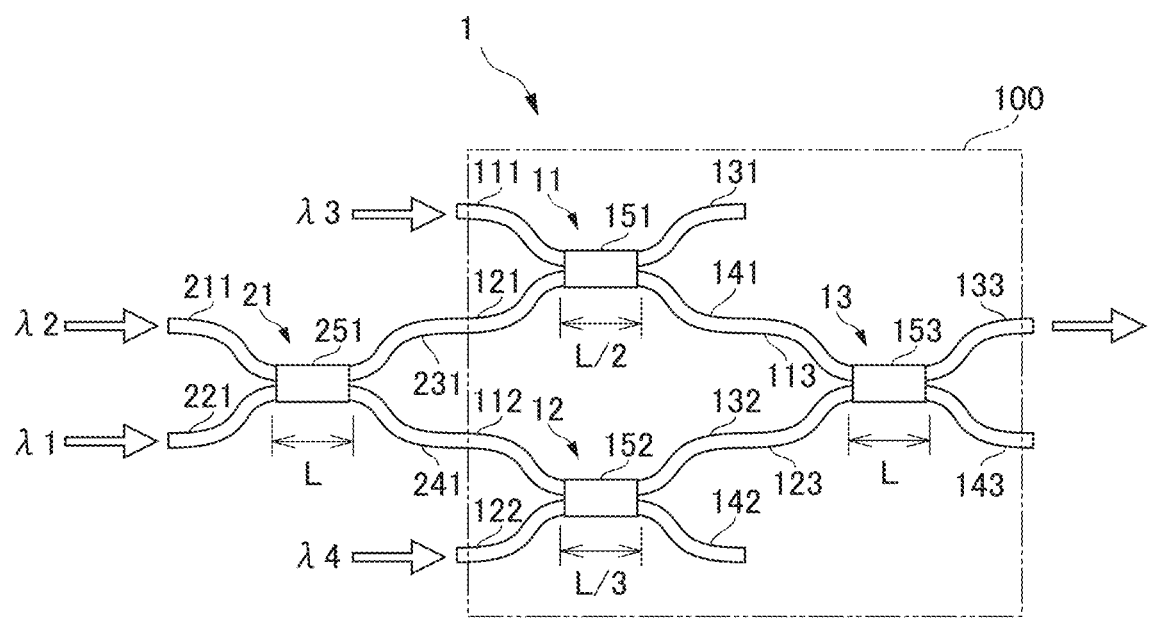
FIG. 3 is a schematic diagram illustrating a configuration of the optical multiplexer of the first embodiment.

Next, the optical multiplexer 1 and the optical multiplexing method according to a first embodiment will be described by referring to FIGS. 1 to 9. As illustrated in FIG. 3, the optical multiplexer 1 includes the reference unit 100 and the sub unit 21. In the present embodiment, the optical multiplexer 1 multiplexes four light, which is first light (wavelength $\lambda 1$), second light (wavelength $\lambda 2$), third light (wavelength $\lambda 3$), and fourth light (wavelength $\lambda 4$). Here, the relationship between the wavelengths of the four light is $\lambda 1 < \lambda 2 < \lambda 3 < \lambda 4$. In the following description of the pair of main entrance paths 110, 120 and the pair of main exit paths 130, 140 illustrated in FIG. 3, paths located on the upper side of the optical multiplexer 1 in the paper plane of the drawings will be referred to as "first", and paths located on the lower side of the optical multiplexer 1 in the paper plane of the drawings will be described as "second".

The reference unit 100 is composed of a set of the plurality of coupling parts 10. In the present embodiment, as illustrated in FIG. 3, the reference unit 100 is composed of a set of three coupling parts 10. Specifically, the reference unit 100 includes a first coupling part 11, a second coupling part 12, and a third coupling part 13.

The first coupling part 11 is configured such that the third light can enter from the first one of the pair of main entrance paths 111, 121. A main coupler 151 of the first coupling part 11 has coupling characteristics to cause light entering from the main entrance path 121 of the first coupling part 11 to exit from the second main exit path 141. Specifically, as illustrated in FIG. 4, the main coupler 151 of the first coupling part 11 has a length L/2, which is a complete coupling length of the third light. Here, L is a complete coupling length for the wavelength $\lambda 2$ of the second light. The second one of the main exit paths 131, 141 of the first coupling part 11 is connected to the first one of the main entrance paths 113, 123 of the third coupling part 13 (to be described later). Specifically, among the main exit paths 131, 141, the main exit path 141 is connected to the first main entrance path 113 of the third coupling part 13, and arranged on the same side where the third light enters the main entrance path 121 of the first coupling part 11, in terms of the border in the lengthwise direction of the main coupler 151. Among the plurality of light, light of the second longest wavelength (the third light in the present embodiment) enters from the first main entrance path 111 of the first coupling part 11.

The second coupling part 12 is configured such that the fourth light can enter from the second one of the pair of main entrance paths 112, 122. The main coupler 152 of the second coupling part 12 has coupling characteristics to cause light entering from the main entrance paths 112, 122 of the second coupling part 12 to exit from the first main exit path 132. Specifically, the main coupler 152 of the second coupling part 12 has a length L/3, which is a complete coupling length of the fourth light. The first main exit path 132 of the second coupling part 12 is connected to the second main entrance path 123 of the third coupling part 13 (to be described later). Specifically, among the main exit paths 132, 142, the main exit path 132 is connected to the second main entrance path 123 of the third coupling part 13, and arranged on the side opposite to the fourth light entering the main entrance path 122, in terms of the border in the lengthwise direction of the main coupler 152. Among the plurality of light, light of the longest wavelength (the fourth light in the present embodiment) enters from the second main entrance path of the second coupling part 12.

The third coupling part 13 is connected to the first coupling part 11 and the second coupling part 12. Specifically, the first main entrance path 113 of the third coupling part 13 is connected to the second main exit path 141 of the first coupling part 11. The second main entrance path 123 of the third coupling part 13 is connected to the first main exit path 132 of the second coupling part 12. The main coupler 153 of the third coupling part 13 has coupling characteristics to cause light entering from the main entrance paths 113, 123 of the third coupling part 13 to exit from the first main exit path 133. Specifically, the main coupler 153 of the third coupling part 13 has a length L, which is a complete coupling length of the second light.

The sub unit 21 is configured to be connectable to the reference unit 100. The sub unit 21 includes a pair of sub entrance paths 211, 221, a pair of sub exit paths 231, 241, and a sub coupler 251. In the present embodiment, a single sub unit 21 is provided, as illustrated in FIG. 3. In the present embodiment, the sub unit 21 is connected to the first coupling part 11 and the second coupling part 12.

Each of the pair of sub entrance paths 211, 221 is a so-called waveguide. Each of the pair of sub entrance paths 211, 221 serves as a transmission path for entering light. In the present embodiment, the second light and the first light enter from the pair of sub entrance paths 211, 221, respectively. Specifically, the second light enters the sub coupler 251 toward the side of the first coupling part 11, in terms of the border in the lengthwise direction of the sub coupler 251. The first light enters from the side of the second coupling part 12. In this embodiment, the sub exit paths 231, 241 are configured to be connectable to the main entrance paths 121, 112. In the present embodiment, the pair of sub entrance paths 211, 221 approach each other along a transmission direction from the entrance ports, and the most typical example of the paths has a shape curved in a direction approaching each other.

Each of the pair of sub exit paths 231, 241 is a so-called waveguide. Each of the pair of sub exit paths 231, 241 serves as a transmission path for the exiting light. In the present embodiment, the pair of sub exit paths 231, 241 separate from each other along the transmission direction toward the exit ports, and the most typical example of the paths has a shape curved in a direction separating from each other.

The optical multiplexer 1 as described above operates as follows. First, the sub unit 21 is coupled to the reference unit 100. Specifically, as illustrated in FIG. 3, the pair of sub exit paths 231, 241 of the sub unit 21 are coupled to the second main entrance path 121 of the first coupling part 11 and the first main entrance path 112 of the second coupling part 12 of the reference unit 100.

Then, the first light (complete coupling length 2L) and the second light (complete coupling length L) enter from the pair of sub entrance paths of the sub unit 21, respectively. Specifically, the first light enters from the second sub entrance path 221. The second light enters from the first sub entrance path 211. The first light enters the sub coupler 251 (coupling length L) from the second sub entrance path 221. The first light is split by the sub coupler 251 and exits from the sub exit paths 231, 241. As a result, the first light is split and exits from each of the pair of sub exit paths 231, 241.

On the other hand, the second light enters the sub coupler 251 from the first sub entrance path 211. The second light is largely transmitted from the first sub entrance path 211 to the second sub exit path 241 via the sub coupler 251. As a result, the second light largely exits from the second sub exit path 241. Specifically, the first light having a split amount of light exits from the first sub exit path 231. The first light having a split amount of light and the second light are multiplexed into multiplexed light (hereinafter also referred to as the first multiplexed light) that exits from the second sub exit path 241.

The third light (complete coupling length L/2) enters from the first main entrance path 111 of the first coupling part 11. The first light exiting from the first sub exit path 231 enters from the second main entrance path 121 of the first coupling part 11. The third light enters the main coupler 151 (coupling length L/2) from the first main entrance path 111. The first light entering from the second main entrance path 121 enters the main coupler 151. The third light is largely transmitted from the first main entrance path 111 to the second main exit path 141 via the main coupler 151. As a result, the third light largely exits from the second main exit path 141. On the other hand, the first light is largely not transmitted to the first main exit path 131 and exits from the second main exit path 141 via the main coupler 151. As a result, the first light and the third light are multiplexed into multiplexed light (hereinafter also referred to as the second multiplexed light) that exits from the second main exit path 141.

The fourth light (complete coupling length L/3) enters from the second main entrance path 122 of the second coupling part 12. The first multiplexed light (the first light and the second light) exiting from the second sub exit path 241 enters from the first main entrance path 112. The fourth light enters the main coupler 152 (coupling length L/3) from the second main entrance path 122. The first multiplexed light enters the main coupler 152 from the first main entrance path 112. The fourth light is largely transmitted from the second main entrance path 122 to the first main exit path 132 via the main coupler 152. As a result, the fourth light largely exits from the first main exit path 132. On the other hand, the first multiplexed light enters the main coupler 152 from the first main entrance path 112. The first multiplexed light is largely not transmitted to the second main exit path 142 and exits from the first main exit path 132 via the main coupler 152. As a result, the fourth light and the first multiplexed light are multiplexed into multiplexed light (hereinafter also referred to as the third multiplexed light) that exits from the first main exit path 132.

The second multiplexed light exiting from the second main exit path 141 enters from the first main entrance path 113 of the third coupling part 13. The third multiplexed light exiting from the first main exit path 132 enters from the second main entrance path 123 of the third coupling part. The second multiplexed light enters the main coupler 153 (coupling length L) from the first main entrance path 113. The third multiplexed light enters the main coupler 153 from the second main entrance path 123.

The first light contained in the second multiplexed light and the third multiplexed light are multiplexed again into single light in the main coupler 153. The first light thus multiplexed exits from the first main exit path 133. Here, the first light is split into the pair of sub exit paths 231, 241 via the sub unit 21 and exits with the phase shifted by 90°. When the first light is coupled in the third coupling part 13, the first light enters the coupling part 13 with the phase shifted by 90°. As a result, in the case of a light coupler, when a phase difference between an even mode and an odd mode of the light coupler is shifted by 90°, the first light transmitted through the coupling part 13 is transmitted to the first main exit path 133 and exits from the first main exit path 133.

The second light contained in the third multiplexed light is largely transmitted from the second main entrance path 123 to the first main exit path 133 via the main coupler 153. As a result, the second light exits from the first main exit path 133.

The third light contained in the second multiplexed light is largely not transmitted from the first main entrance path 113 to the second main exit path 143 via the main coupler 153, or even if the third light is transmitted via the main coupler 153, the third light eventually returns and exits from the first main exit path 133.

The fourth light contained in the third multiplexed light is largely transmitted from the second main entrance path 123 to the first main exit path 133 via the main coupler 153. As a result, the second light exits from the first main exit path 133. Thus, the first light, the second light, the third light, and the fourth light are multiplexed into the fourth multiplexed light that exits from the first main exit path 133.

Next, the optical multiplexing method will be described. The optical multiplexing method includes a first multiplexed light outputting step, a second multiplexed light outputting step, a third multiplexed light outputting step, and a fourth multiplexed light outputting step.

In the first multiplexed light outputting step, part of the first light and the second light are multiplexed into the first multiplexed light and outputted. Specifically, the first multiplexed light is light exiting from the second sub exit path 241 of the sub unit 21. In the present embodiment, in the first multiplexed light outputting step, other part of the first light exits from the first sub exit path 231, aside from the first multiplexed light.

In the second multiplexed light outputting step, other part of the first light and the third light are multiplexed into the second multiplexed light and outputted. Specifically, in the second multiplexed light outputting step, the first light exiting from the first sub exit path 231 and the third light are multiplexed into the second multiplexed light and outputted. The second multiplexed light is light exiting from the second main exit path 141 of the first coupling part 11.

In the third multiplexed light outputting step, the first multiplexed light and the fourth light are multiplexed into the third multiplexed light and outputted. The third multiplexed light is light exiting from the first main exit path 132 of the second coupling part 12.

In the fourth multiplexed light outputting step, the second multiplexed light and the third multiplexed light thus outputted are multiplexed into the fourth multiplexed light and outputted. Specifically, the fourth multiplexed light is light exiting from the first main exit path 133 of the third coupling part 13. The fourth multiplexed light is light obtained by multiplexing the four light.

Example 1

Next, Example 1 of the present embodiment will be described. As illustrated in FIG. 5, λ1=450 nm, λ2=520 nm, λ3=635 nm, and λ4=720 nm. As a result, the multiplexing efficiency of the multiplexed light exiting from the first main exit path 133 of the third coupling part 13 were 96.1% for λ1, 92.8% for λ2, 98.0% for λ3, and 99.9% for λ4.

Figure 6:
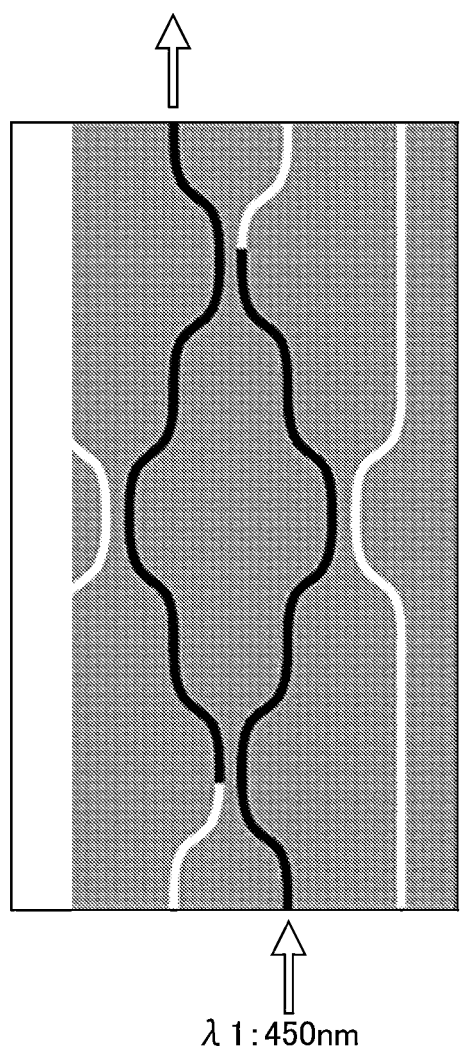
FIG. 6 is an image diagram illustrating a route through which first light enters the optical multiplexer of the first embodiment.

As a result, as illustrated in FIG. 6, the first light enters from the second sub entrance path 221 of the sub unit 21 and exits from each of the pair of sub exit paths 231, 241. Thereafter, the first light entered from the second main entrance path 121 of the first coupling part 11 and exited from the second main exit path 141. The first light entered from the first main entrance path 112 of the second coupling part 12 and exited from the first main exit path 132. The first light entered from the pair of main entrance paths 113, 123 of the third coupling part 13 and exited from the first main exit path 133.

Figure 7:
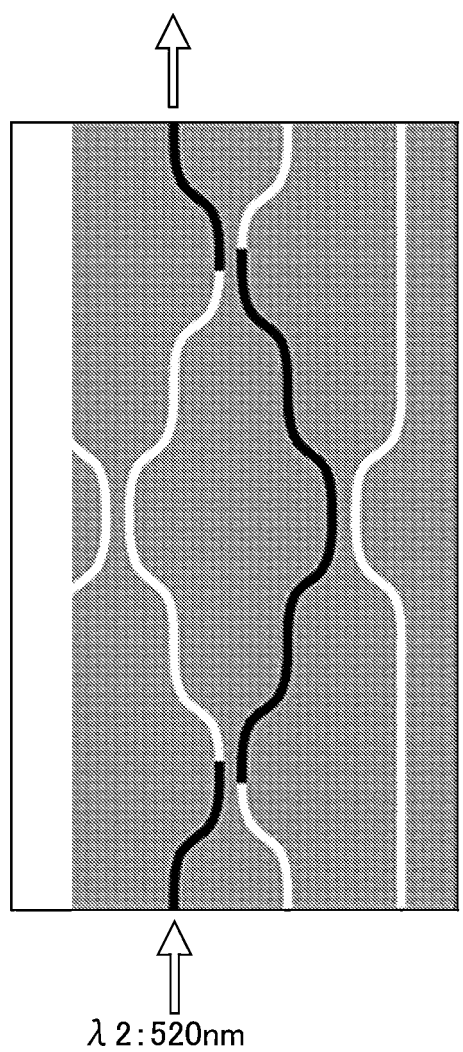
FIG. 7 is an image diagram illustrating a route through which second light enters the optical multiplexer of the first embodiment.

As illustrated in FIG. 7, the second light entered from the first sub entrance path 211 of the sub unit 21 and exited from the second sub exit path 241. The second light entered from the first main entrance path 112 of the second coupling part 12 and exited from the first main exit path 132. The second light entered from the second main entrance path 123 of the third coupling part 13 and exited from the first main exit path 133.

Figure 8:
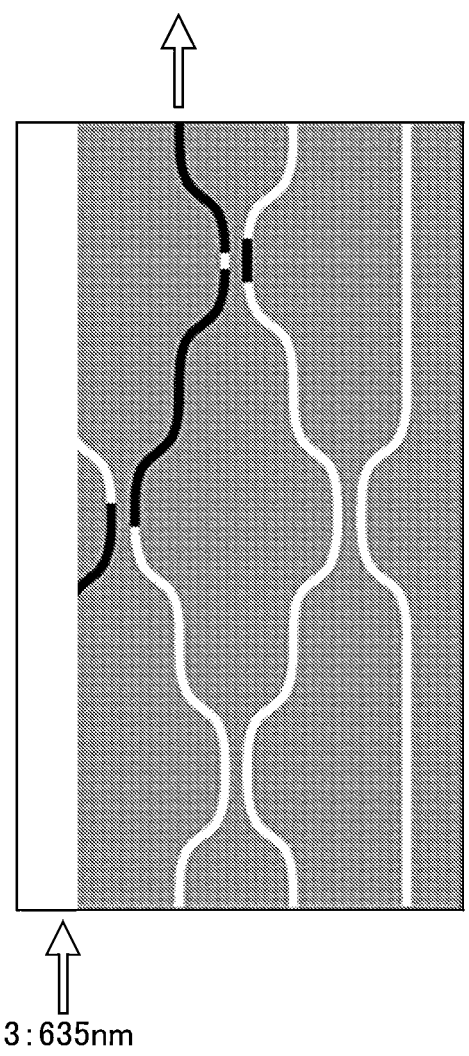
FIG. 8 is an image diagram illustrating a route through which third light enters the optical multiplexer of the first embodiment.

As illustrated in FIG. 8, the third light entered from the first main entrance path 111 of the first coupling part 11 and exited from the second main exit path 141. The third light entered from the first main entrance path 113 of the third coupling part 13 and exited from the first main exit path 133.

Figure 9:
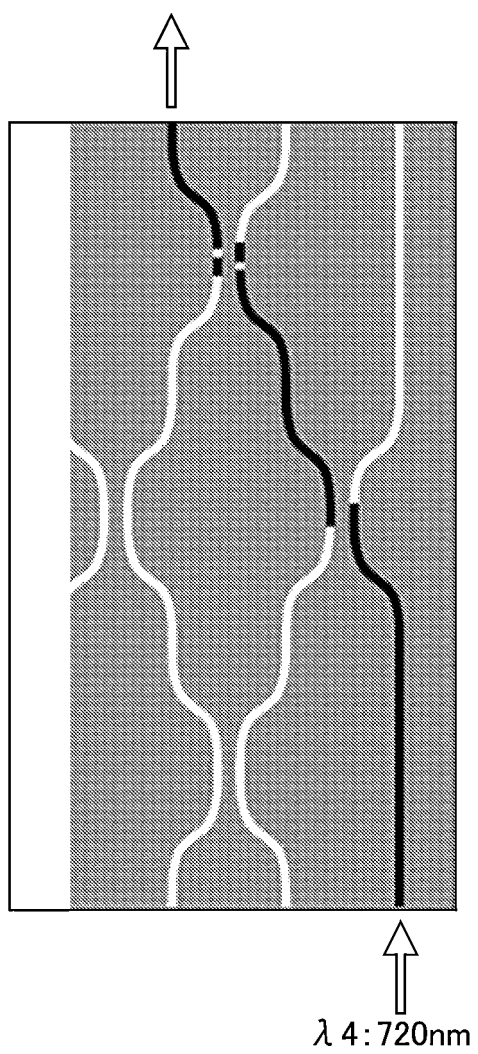
FIG. 9 is an image diagram illustrating a route through which fourth light enters the optical multiplexer of the first embodiment.

As illustrated in FIG. 9, the fourth light entered from the second main entrance path 122 of the second coupling part 12 and exited from the first sub exit path 132. The fourth light entered from the second main entrance path 123 of the third coupling part 13 and exited from the first main exit path 133. As a result, it was found that the first light, the second light, the third light, and the fourth light exit from the first main exit path 133 of the third coupling part 13.

The optical multiplexer 1 and the optical multiplexing method according to the present embodiment can achieve the following effects.

(1) The optical multiplexer 1 can multiplex light of a plurality of wavelengths, in which the optical multiplexer includes the plurality of coupling parts 10 each including the pair of main entrance paths 110, 120, the pair of main exit paths 130, 140, and the main coupler 150 arranged between the main entrance paths 110, 120 and the main exit paths 130, 140; the main coupler 150 couples light entering from the main entrance paths 110, 120 and causes the light to exit from the main exit paths 130, 140; one of the first main entrance paths 110, 120 of the coupling parts 10 is joined to one of the main entrance paths 130, 140 of another coupling part 10; and the main coupler 150 each has coupling characteristics different from those of at least one other main coupler 150. As a result, light to be multiplexed through the plurality of coupling parts 10 may be collectively outputted from any one of the main exit paths 130, 140 of any one of the coupling parts 10. Therefore, a plurality of (four or more) light can be easily multiplexed. In particular, the coupling relationship between the plurality of coupling parts 10 is changed, whereby the optical multiplexer 1 capable of flexibly handling inputted wavelengths can be provided.

(2) The reference unit 100 including a set of the plurality of coupling parts 10, and the sub unit 21 connectable to the reference unit 100 are provided, in which the sub unit 21 includes the pair of sub entrance paths 211, 221, the pair of sub exit paths 231, 241, and the sub coupler 251 that couples light entering from the sub entrance paths 211, 221 and causes the light to exit from the sub exit paths 231, 241, and in which the sub exit paths 231, 241 are configured to be connectable to the main entrance paths 110, 120. As a result, the sub unit 21 is connected in free recombination to the reference unit 100, whereby the positions where the entering light and the multiplexed light exit can be appropriately controlled. Therefore, flexibility of the optical multiplexer 1 can be improved.

(3) The reference unit 100 includes a set of three coupling parts 10, in which the second one of the main exit paths 131, 141 of the first coupling part 11 is connected to the first one of the main entrance paths 113, 123 of the third coupling part 13; the first one of the main exit paths 132, 142 of the second coupling part 12 is connected to the second one of the main entrance paths 113, 123 of the third coupling parts 13; and the main coupler 151 of the first coupling part 11, the main coupler 152 of the second coupling part 12, and the main coupler 153 of the third coupling part 13 have different coupling characteristics. As a result, the positions where the plurality of light of different wavelengths exits from each of the coupling parts 10 can be limited to some extent. Therefore, light of various wavelengths can be multiplexed by connecting and adjusting the plurality of sub units 21 based on reference unit 100.

(4) The main coupler 151 of the first coupling part 11 has coupling characteristics to cause light entering from any one of the main entrance paths 111, 121 of the first coupling part 11 to exit from the second one of the main exit paths 131, 141; the main coupler 152 of the second coupling part 12 has coupling characteristics to cause light entering from any one of the main entrance paths 112, 122 of the second coupling part 12 to exit from the first one of the main exit paths 132, 142; and the main coupler 153 of the third coupling part 13 has coupling characteristics to cause light entering from any one of the main entrance paths 113, 123 of the third coupling part 13 to exit from any one of the main exit paths 133, 143. As a result, the light exiting from the reference unit 100 can be collectively outputted from any one of the main exit paths 133, 143 of the third coupling part 13.

(5) The first one of the sub exit paths 231, 241 of the sub unit 21 is connected to the second main entrance path 121 of the first coupling part 11, and the second sub exit path 241 of the sub unit 21 is connected to the first main entrance path 112 of the second coupling part 12. As a result, the four entering light can be preferably coupled.

(6) The sub coupler 251 of the sub unit 21 has coupling characteristics to cause light entering from the pair of sub entrance paths 211, 221 to exit from at least the first one of the first sub exit paths 231, 241. As a result, light entering the sub unit can be adjusted to a preferable state before entering the reference unit 100.

(7) The sub coupler 251 of the sub unit 21 has coupling characteristics to cause at least any one of the light entering from the pair of sub entrance paths 211, 221 to be split and exit from the pair of sub exit paths 231 and 241.

(8) The optical multiplexing method of multiplexing light of a plurality of wavelengths includes: the first multiplexed light outputting step of multiplexing part of the first light and the second light into the first multiplexed light and outputting the first multiplexed light; the second multiplexed light outputting step of multiplexing other part of the first light and the third light into the second multiplexed light and outputting the second multiplexed light; the third multiplexed light outputting step of multiplexing the first multiplexed light and the fourth light into the third multiplexed light and outputting the third multiplexed light; and the fourth multiplexed light outputting step of multiplexing the second multiplexed light and the third multiplexed light into the fourth multiplexed light and outputting the fourth multiplexed light. As a result, light of four or more wavelengths can be easily multiplexed.

(9) $\lambda 1 < \lambda 2 < \lambda 3 < \lambda 4$, in which the wavelength of the first light is $\lambda 1$, the wavelength of the second light is $\lambda 2$, the wavelength of the third light is $\lambda 3$, and the wavelength of the fourth light is $\lambda 4$. As a result, light of four or more wavelengths can be preferably coupled.

Second Embodiment

Figure 10:
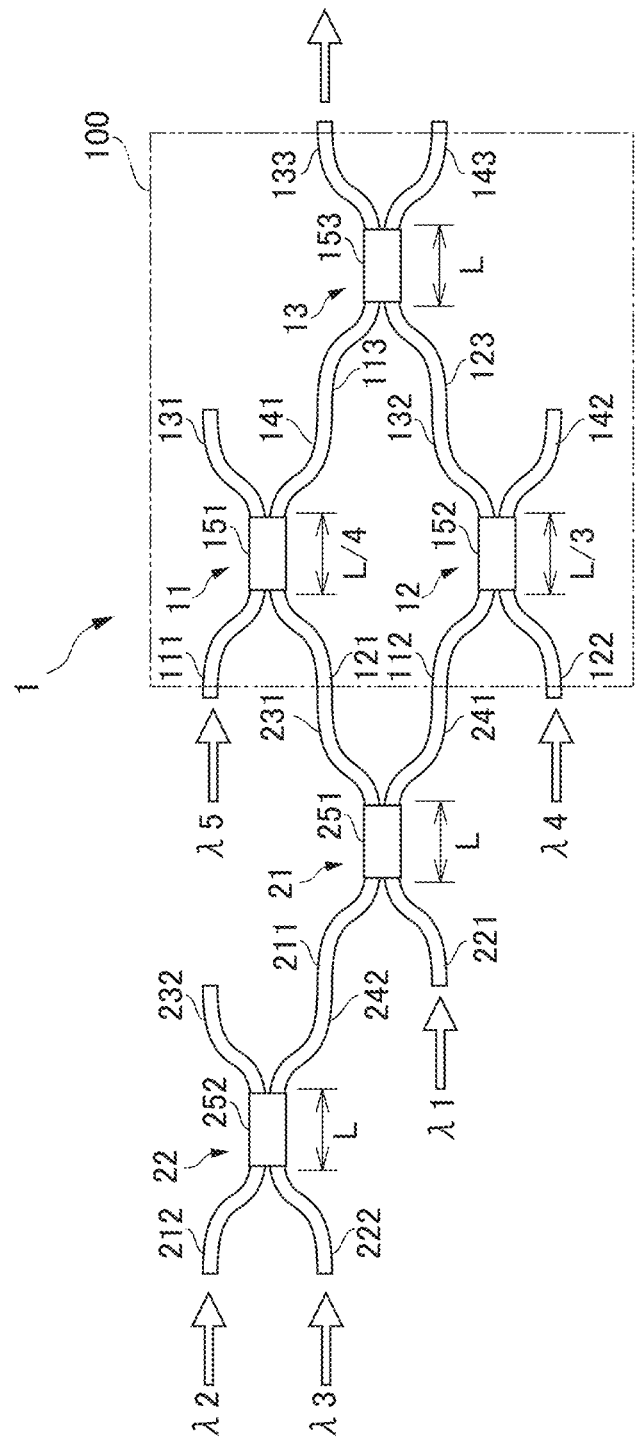
FIG. 10 is a schematic diagram illustrating a configuration of an optical multiplexer according to a second embodiment of the present invention.

Next, an optical multiplexer 1 and an optical multiplexing method according to a second embodiment of the present invention will be described by referring to FIGS. 10 to 12. In describing the second embodiment, the same reference numerals are assigned to the same constituent elements as those of the above-described embodiment, and description thereof is omitted or simplified. The optical multiplexer 1 and the optical multiplexing method according to the second embodiment multiplex five light, which is a difference from the first embodiment. As illustrated in FIG. 10, with the optical multiplexer 1 and the optical multiplexing method according to the second embodiment, a further sub unit 22 is connected to one reference unit 100 and one sub unit 21, which is a difference from the first embodiment.

As illustrated in FIG. 11, with the optical multiplexer 1 and the optical multiplexing method according to the second embodiment, the wavelength of the first light is $\lambda 1$, the wavelength of the second light is $\lambda 2$, the wavelength of the third light is $\lambda 3$, the wavelength of the fourth light is $\lambda 4$, and the wavelength of the fifth light is $\lambda 5$, which is a difference from the first embodiment.

With the optical multiplexer 1 and the optical multiplexing method according to the second embodiment, the complete coupling length of respective light is 2L, L, L/2, L/3, and L/4, which is a difference from the first embodiment. With the optical multiplexer 1 and the optical multiplexing method according to the second embodiment, $\lambda 1 < \lambda 2 < \lambda 3 < \lambda 4 < \lambda 5$, which is a difference from the first embodiment.

As illustrated in FIG. 10, the optical multiplexer 1 has a configuration in which a further sub unit (hereinafter, referred to as the second sub unit 22) is connected to the optical multiplexer 1 of the first embodiment. Specifically, the optical multiplexer 1 has a configuration in which the second sub exit path 242 of another sub unit (the second sub unit 22) is connected to the first sub entrance path 211 of the sub unit of the first embodiment (hereinafter, referred to as the first sub unit 21). In other words, the second one of the sub exit paths 232, 242 of the second sub unit 22 is configured to be connectable to the first one of the sub entrance paths 211, 221 of another sub unit (the first sub unit 21). With the optical multiplexer 1 and the optical multiplexing method according to the second embodiment, the fifth light enters from the first main entrance path 111 of the first coupling part 11. The fourth light enters from the second main entrance path 122 of the second coupling part 12. With the optical multiplexer 1 and the optical multiplexing method according to the second embodiment, the complete coupling length of the first coupling part 11 is L/4, and the complete coupling length of the second coupling part 12 is L/3, which is a difference from the first embodiment. The first coupling part 11 and the second coupling part 12 have the complete coupling lengths of the fifth light and the fourth light, which directly enter the first coupling part 11 and the second coupling part 12, respectively.

The second sub unit 22 includes a sub coupler 252 having a complete coupling length L. Specifically, the second sub unit 22 and the first sub unit 21 have the same configuration. The second light enters from the first sub entrance path 212 of the second sub unit 22. The third light enters from the second sub entrance path 222 of the second sub unit 22.

Next, an operation of the optical multiplexer 1 of the present embodiment will be described. The first light enters and exits in a manner similar to the first embodiment.

The second light exits from the second sub exit path 242 of the second sub unit 22. The second light subsequently flows in a manner similar to the first embodiment.

The third light exits from the second sub exit path 242 of the second sub unit 22. Subsequently, the third light enters from the first sub entrance path 211 of the first sub unit 21 and exits from the first sub exit path 231. The third light enters from the second main entrance path 121 of the first coupling part 11 and exits from the second main exit path 141. The third light enters from the first main entrance path 113 of the third coupling part 13 and exits from the first main exit path 133.

The fourth light enters from the second main entrance path 122 of the second coupling part 12 and exits from the first main exit path 132. The fourth light enters from the second main entrance path 123 of the third coupling part 13 and exits from the first main exit path 133.

The fifth light enters from the first main entrance path 111 of the first coupling part 11 and exits from the second main exit path 141. The fifth light enters from the first main entrance path 113 of the third coupling part 13 and exits from the first main exit path 133.

Example 2

As illustrated in FIG. 12, $\lambda 1=450$ nm, $\lambda 2=520$ nm, $\lambda 3=635$ nm, $\lambda 4=720$ nm, and $\lambda 5=840$ nm. As a result, it was found that the light was satisfactorily multiplexed with multiplexing efficiency of 97.7%, 91.6%, 87.3%, 99.8%, and 96.8%, respectively.

The optical multiplexer 1 and the optical multiplexing method according to the present embodiment can achieve the following effects.

(10) The first one of the sub entrance paths 211, 221 is configured to be connectable to the second one of the sub exit paths 232, 242 of another sub unit 22. As a result, by combining the plurality of sub units 21, light of a plurality of wavelengths can be flexibly multiplexed.

Third Embodiment

Figure 13:
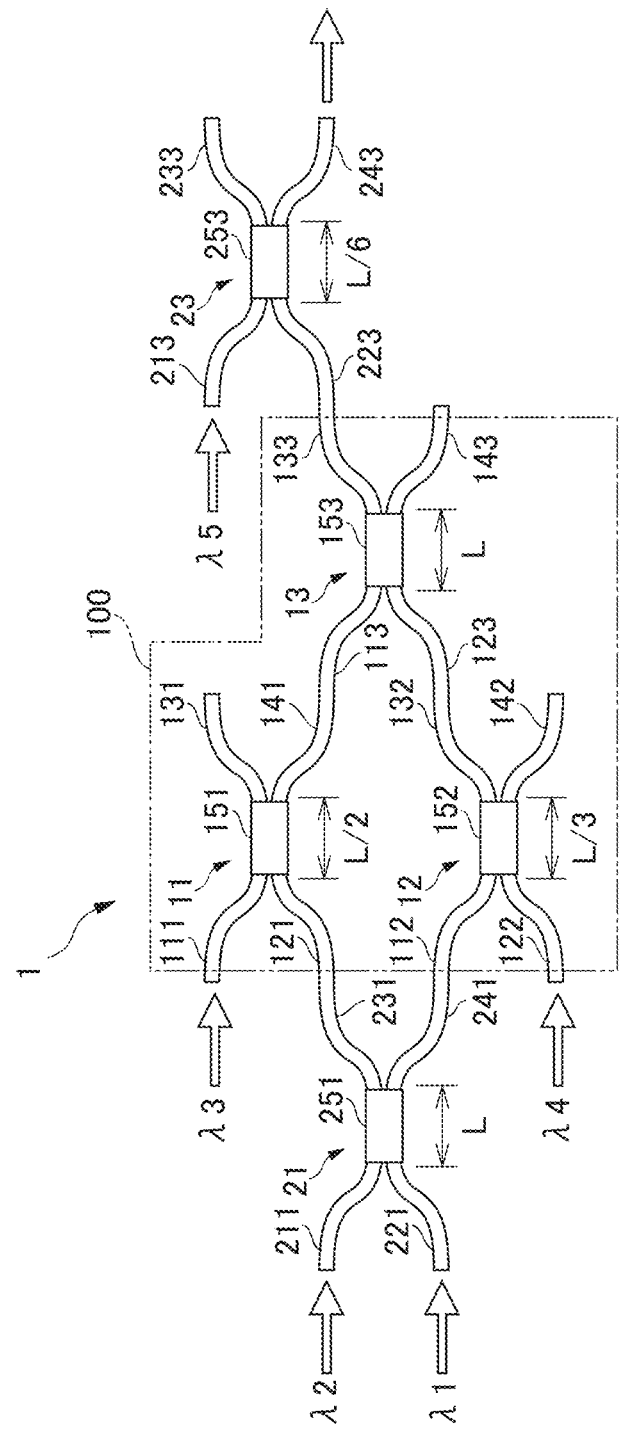
FIG. 13 is a schematic diagram illustrating a configuration of an optical multiplexer according to a third embodiment of the present invention.

Next, an optical multiplexer 1 and an optical multiplexing method according to a third embodiment of the present invention will be described by referring to FIGS. 13 to 15. In describing the third embodiment, the same reference numerals are assigned to the same constituent elements as those of the above-described embodiments, and description thereof is omitted or simplified. The optical multiplexer 1 and the optical multiplexing method according to the third embodiment multiplex five light, which is a difference from the first embodiment. As illustrated in FIG. 13, with the optical multiplexer 1 and the optical multiplexing method according to the third embodiment, a further sub unit 23 is connected to one reference unit 100 and one sub unit 21, which is a difference from the first embodiment.

As illustrated in FIG. 14, with the optical multiplexer 1 and the optical multiplexing method according to the third embodiment, the wavelength of the first light is $\lambda 1$, the wavelength of the second light is $\lambda 2$, the wavelength of the third light is $\lambda 3$, the wavelength of the fourth light is $\lambda 4$, and the wavelength of the fifth light is $\lambda 5$, which is a difference from the first embodiment.

With the optical multiplexer 1 and the optical multiplexing method according to the third embodiment, the complete coupling length of the respective light is 2L, L, L/2, L/3, and L/6, which is a difference from the first and second embodiments. With the optical multiplexer 1 and the optical multiplexing method according to the third embodiment, $\lambda 1 < \lambda 2 < \lambda 3 < \lambda 4 < \lambda 5$, which is a difference from the first embodiment. With the optical multiplexer 1 and the optical multiplexing method according to the third embodiment, the second sub entrance path 223 of the third sub unit 23 is connected to the first one of main exit paths 133, 134 of the third coupling part 13, which is a difference from the first and second embodiments. The fifth light enters from the first sub entrance path 213 of the third sub unit 23, which is a difference from the first embodiment. The third sub unit 23 has a complete coupling length L/6.

The third sub unit 23 includes a sub coupler having a complete coupling length L/6. The fifth light enters from the first sub entrance path 213 of the third sub unit 23. The first main exit path 133 of the third coupling part 13 is connected to the second sub entrance path 223 of the third sub unit 23.

Next, an operation of the optical multiplexer 1 according to the present embodiment will be described. The entering/exiting relationship between the first to fourth light is similar to that in the first embodiment, until the light exits from the first main exit path 133 of the third coupling part 13. The first to fourth light enters from the second sub entrance path 223 of the third sub unit 23 and exits from the second sub exit path 243.

The fifth light enters from the first sub entrance path 213 of the third sub unit and exits from the second sub exit path 243. As a result, the first to fifth light is multiplexed.

Example 3

As illustrated in FIG. 15, $\lambda 1=450$ nm, $\lambda 2=520$ nm, $\lambda 3=635$ nm, $\lambda 4=720$ nm, and $\lambda 5=960$ nm. As a result, it was found that the light was satisfactorily multiplexed with multiplexing efficiency of 96.1%, 92.7%, 97.6%, 94.8%, and 95.9%, respectively.

The preferred embodiments of the optical multiplexer and the optical multiplexing method of the present invention have been described above; however, the present invention is not limited to the above-described embodiments and can be modified as appropriate. For example, in the embodiments described above, the complete coupling length is achieved by changing the length of the main coupler 150 and the sub coupler 251; however, the present invention is not limited thereto. The complete coupling length may be achieved by changing an interval between two waveguides. The complete coupling length may be achieved by changing a waveguide width.

In the embodiments described above, the number of the sub units 21 is not limited to one or two, and more sub units 21 may be used. In this case, the sub units 21 having various complete coupling lengths may be combined, depending on the wavelengths of the entering light.

In the embodiments described above, the optical coupling method may include a step of connecting an exit path of the coupling part 10 to an entrance path of another coupling part 10, the coupling part 10 capable of multiplexing at least two light. As a result, light can be multiplexed by flexibly coupling various couplers, in accordance with the number of light and the wavelengths of light to be multiplexed.

EXPLANATION OF REFERENCE NUMERALS

1: optical multiplexer
10: coupling part
11: first coupling part
12: second coupling part
13: third coupling part
21, 22, 34: sub unit
100: reference unit
110, 111, 112, 113, 120, 121, 122, 123: main entrance path
130, 131, 132, 133, 140, 141, 142, 143: main exit path
150, 151, 152, 153: main coupler
211, 221, 212, 222, 213, 223: sub entrance path
231, 241, 232, 242, 233, 243: sub exit path
251: sub coupler It is claimed:

1. An optical multiplexer capable of multiplexing lights of a plurality of wavelengths, the optical multiplexer comprising:
a plurality of coupling parts each including a pair of main entrance paths, a pair of main exit paths, and a main coupler arranged between the main entrance paths and the main exit paths, the main coupler causing light entering from the main entrance paths to be coupled and exit from the main exit paths, wherein
one of the main entrance paths of one of the coupling parts is joined to one of the main exit paths of another of the coupling parts, and
the main coupler of each of the coupling parts has a coupling length, different from that of at least one other main coupler;
a reference unit including a set of the plurality of coupling parts, wherein
a set of three of the coupling parts includes a first coupling part, a second coupling part, and a third coupling part,
a second one of the main exit paths of the first coupling part is connected to a first one of the main entrance paths of the third coupling part,
a first one of the main exit paths of the second coupling part is connected to a second one of the main entrance paths of the third coupling part, and
the main coupler of the first coupling part, the main coupler of the second coupling part, and the main coupler of the third coupling part have different coupling lengths; and
a sub unit connectable to the reference unit, wherein the sub unit includes:
a pair of sub entrance paths,
a pair of sub exit paths, and
a sub coupler causing light entering from the sub entrance paths to be coupled and exit from the sub exit paths, wherein
the sub entrance paths are configured to be connectable to the main exit paths,
the sub exit paths are configured to be connectable to the main entrance paths,
a first one of the sub exit paths of the sub unit is connected to a second one of the main entrance paths of the first coupling part, and
a second one of the sub exit paths of the sub unit is connected to a first one of the main entrance paths of the second coupling part.

2. The optical multiplexer according to claim 1, wherein the sub entrance paths are configured to be connectable to the sub exit paths of another sub unit.

3. The optical multiplexer according to claim 1, wherein the sub exit paths are configured to be connectable to the sub entrance paths of another sub unit.

4. The optical multiplexer according to claim 1, wherein
the main coupler of the first coupling part has a coupling length to cause light entering from any one of the main entrance paths of the first coupling part to exit from a second one of the main exit paths,
the main coupler of the second coupling part has a coupling length to cause light entering from any one of the main entrance paths of the second coupling part to exit from a first one of the main exit paths, and
the main coupler of the third coupling part has a coupling length to cause light entering from any one of the main entrance paths of the third coupling part to exit from any one of the main exit paths.

5. The optical multiplexer according to claim 1, wherein the sub coupler of the sub unit has a coupling length to cause light entering from the pair of sub entrance paths to exit from at least a first one of the sub exit paths.

6. The optical multiplexer according to claim 1, wherein a second one of the sub entrance paths of the sub unit is connected to a first one of the sub exit paths of another sub unit.

7. The optical multiplexer according to claim 1, wherein a first one of the main exit paths of the third coupling part is connected to a second one of the sub entrance paths of another sub unit.

8. An optical multiplexing method of multiplexing lights of a plurality of wavelengths, the method comprising:
a first multiplexed light outputting step of multiplexing part of first light and second light into first multiplexed light and outputting the first multiplexed light;
a second multiplexed light outputting step of multiplexing other part of the first light and third light into second multiplexed light and outputting the second multiplexed light;
a third multiplexed light outputting step of multiplexing the first multiplexed light and fourth light into third multiplexed light and outputting the third multiplexed light; and
a fourth multiplexed light outputting step of multiplexing the second multiplexed light and the third multiplexed light into fourth multiplexed light and outputting the fourth multiplexed light.

9. The optical multiplexing method according to claim 8, wherein $\lambda 1 < \lambda 2 < \lambda 3 < \lambda 4$, where a wavelength of the first light is $\lambda 1$, a wavelength of the second light is $\lambda 2$, a wavelength of the third light is $\lambda 3$, and a wavelength of the fourth light is $\lambda 4$.

* * * * *